(12) United States Patent
Li et al.

(10) Patent No.: US 11,959,604 B2
(45) Date of Patent: Apr. 16, 2024

(54) DISPLAY SCREEN AND DISPLAY DEVICE

(71) Applicant: TCL CHINA STAR OPTOELECTRONICS TECHNOLOGY CO., LTD., Guangdong (CN)

(72) Inventors: Meinan Li, Guangdong (CN); Xing Lei, Guangdong (CN); Xu Wang, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/618,467

(22) PCT Filed: Nov. 30, 2021

(86) PCT No.: PCT/CN2021/134328
§ 371 (c)(1),
(2) Date: Dec. 11, 2021

(87) PCT Pub. No.: WO2023/082369
PCT Pub. Date: May 19, 2023

(65) Prior Publication Data
US 2024/0011609 A1    Jan. 11, 2024

(30) Foreign Application Priority Data

Nov. 15, 2021   (CN) .......................... 202111346484.1

(51) Int. Cl.
*F21S 4/28*   (2016.01)
*F21S 4/24*   (2016.01)
(Continued)

(52) U.S. Cl.
CPC . *F21S 4/28* (2016.01); *F21S 4/24* (2016.01); *F21V 7/0058* (2013.01); *F21Y 2115/10* (2016.08)

(58) Field of Classification Search
CPC .............. F21S 4/24; F21S 4/28; G02B 6/0078
See application file for complete search history.

(56) References Cited

U.S. PATENT DOCUMENTS

2010/0225572 A1* 9/2010 Suminoe .............. G02B 6/0028
362/97.1
2010/0232141 A1* 9/2010 Kim ..................... G02B 6/0068
362/97.1
(Continued)

FOREIGN PATENT DOCUMENTS

CN         201402568 Y       2/2010
CN         101770732 A       7/2010
(Continued)

OTHER PUBLICATIONS

Chinese Office Action in corresponding Chinese Patent Application No. 202111346484.1 dated May 23, 2022, pp. 1-8.
(Continued)

*Primary Examiner* — Eric T Eide
(74) *Attorney, Agent, or Firm* — PV IP PC; Wei Te Chung; Zhigang Ma

(57) ABSTRACT

A display screen and a display device are provided. The display screen includes a display panel assembly, a light bar, and a reflective layer. The display panel assembly includes at least two display panels with a splicing gap between each two display panels. The light bar is attached to a display surface of the display panel assembly, covers the splicing gap, and has two opposite side surfaces extending along a length of the splicing gap. At least one side surface of the light bar is provided with the reflective layer to prevent black borders from appearing on the side surfaces of the light bar.

19 Claims, 2 Drawing Sheets

(51) Int. Cl.
*F21V 7/00* (2006.01)
*F21Y 115/10* (2016.01)

(56) References Cited

U.S. PATENT DOCUMENTS

| | | | | |
|---|---|---|---|---|
| 2011/0109836 A1* | 5/2011 | Tanaka | ............... | G02B 6/0078 |
| | | | | 362/613 |
| 2011/0221785 A1* | 9/2011 | Joung | ............... | G02B 6/0053 |
| | | | | 362/97.3 |
| 2014/0119051 A1* | 5/2014 | Qiao | ............... | G02B 6/0078 |
| | | | | 362/609 |
| 2015/0055369 A1* | 2/2015 | Tarsa | ............... | G02B 6/0085 |
| | | | | 362/613 |
| 2015/0362657 A1 | 12/2015 | Wang | | |
| 2021/0343196 A1 | 11/2021 | Wei | | |

FOREIGN PATENT DOCUMENTS

| | | | |
|---|---|---|---|
| CN | 102207567 | A | 10/2011 |
| CN | 104035233 | A | 9/2014 |
| CN | 104299519 | A | 1/2015 |
| CN | 105448198 | A | 3/2016 |
| CN | 105845036 | A | 8/2016 |
| CN | 106842711 | A | 6/2017 |
| CN | 207009016 | U | 2/2018 |
| CN | 109785753 | A | 5/2019 |
| CN | 111290154 | A | 6/2020 |
| CN | 111385504 | A | 7/2020 |
| CN | 111653207 | A | 9/2020 |
| CN | 212161167 | U | 12/2020 |
| CN | 212516414 | U | 2/2021 |
| CN | 112856263 | A | 5/2021 |
| CN | 213815319 | U | 7/2021 |
| JP | 2012108271 | A | 6/2012 |
| JP | 2012150366 | A | 8/2012 |
| WO | 2021086579 | A1 | 5/2021 |

OTHER PUBLICATIONS

International Search Report in International application No. PCT/CN2021/134328, dated Jul. 27, 2022.
Written Opinion of the International Searching Authority in International application No. PCT/CN2021/134328, dated Jul. 27, 2022.
Japanese Office Action issued in corresponding Japanese Patent Application No. 2021-572470 dated Jan. 29, 2024, pp. 1-5.

* cited by examiner

DISPLAY SCREEN AND DISPLAY DEVICE

FIELD OF DISCLOSURE

The present application relates to a field of display technology and in particular, to a display screen and a display device.

DESCRIPTION OF RELATED ART

With an increasing demand for splicing products on the market, splicing display screens are getting popular due to their price advantages. However, the splicing display screens are likely to form splicing seams during a splicing process, which affects display performance of the splicing display screens. In order to solve the problem of splicing seams, direct display light bars are often attached to the splicing seams of the splicing display screen to make up for a compromised display effect at the splicing seams. However, due to a level difference between the light bar and the splicing display screen, black borders are prone to appear when the splicing display screen is viewed from a side, which affects side view quality of the splicing display screen.

SUMMARY

The present application provides a display screen and a display device, which can solve a black border problem when the display screen is viewed from a side.

The present application provides a display screen, comprising:
- a display panel assembly comprising at least two display panels with a splicing gap between each two display panels;
- a plurality of light bars attached to a display surface of the display panel assembly, wherein the light bars cover the splicing gaps, and each light bar comprises two opposite side surfaces extending along a length direction of the corresponding splicing gap; and
- a plurality of reflective layers disposed on at least one side surface of each light bar, wherein each reflective layer extends along the length direction of the corresponding splicing gap.

By arranging the reflective layer on at least one side surface of the light bar, light emitted by a display image on the display screen can be reflected by the reflective layer after irradiating the reflective layer, so as to achieve smooth transition of the display image of the display screen from the light bar to the display panel, which prevents appearance of black borders on the side surface of the light bar when the display screen is viewed from the side, thereby improving overall display performance of the display screen.

Optionally, in some embodiments of the present application, the display panel assembly comprises multiple display panels spliced together.

The splicing of multiple display panels can meet the different requirements for the display screen in size, shape, and display effects, and widen an application range of the display screen.

Optionally, in some embodiments of the present application, each light bar covers the splicing gap between corresponding two adjacent display panels.

By covering the splicing gap between any two adjacent display panels, the light bar can improve the display image at any splicing gap in the display screen, thereby ensuring display integrity of the entire display screen.

Optionally, in some embodiments of the present application, an edge of each display panel comprising a non-display area, and each light bar covers the non-display areas at two sides of the corresponding splicing gap.

By covering the non-display areas at two sides of each splicing gap using the corresponding light bar, the display image on the non-display areas of the display screen can be improved to avoid black lines appearing on two sides of each light bar resulting from that the non-display areas are not covered when the display screen is in use. Accordingly, the present application can ensure the overall integrity of the display image on the display screen.

Optionally, in some embodiments of the present application, an angle is included between planes on which surfaces of two adjacent display panels are located.

As two adjacent display panels are arranged on planes which include an angle, a splicing method of display panel assembly is not limited to splicing on a same plane, so an application range of the display screen is widened.

Optionally, in some embodiments of the present application, the plurality of reflective layers are disposed on two side surfaces of each light bar.

By setting the plurality of reflective layers on the two side surfaces of the light bar, the reflective layers can alleviate a black border problem on the side surfaces of the light bar no matter from which side the display screen is viewed. Therefore, the overall display performance is ensured without limiting a setting position of the display screen, thus improving flexibility and adaptability of the display screen.

Optionally, in some embodiments of the present application, a surface of each reflective layer comprises a first reflective area and a second reflective area, wherein the first reflective area is disposed at two opposite sides of the second reflective area along a thickness direction of the light bar, and a grayscale value on the surface of each reflective layer is less in the first reflective area than in the second reflective area.

By setting the grayscale value on the surface of the reflective layer to be less in the first reflective area than in the second reflective area, brightness of the first reflective area away from the display panel is not too high due to influence of the light string when the display screen plays images. When the display screen does not display images, the first reflective area close to the display panel is closer to a color of the display panel itself, so that the display image is continuous on the side surface of the light bar and the adjacent display panel when the display screen is not in use, and the consistency of the overall display image on the display screen is ensured.

Optionally, in some embodiments of the present application, the grayscale value on the surface of each reflective layer is less than or equal to 32.

By setting the grayscale value on the surface of the reflective layer to be less than or equal to 32, bright edges are eliminated and smooth transition is ensured between the side surface of the light bar and the display pane continuous transition when the display screen is not in use.

Optionally, in some embodiments of the present application, each light bar comprises a light string and a circuit board, and each light string is disposed on one side of the corresponding light bar away from the display panel assembly.

By arranging the light string on the side of the light bar away from the display panel assembly, the present application improves the brightness of the light bar and also facilitates a circuit design of the circuit board.

Optionally, in some embodiments of the present application, a thickness of each reflective layer is less than or equal to 100 micrometers.

By setting the thickness of the reflective layer to be less than or equal to 10 micrometers, it can be ensured that when the side surface of the light bar reflects the display image of the display panel, the display effect is not affected when the display screen is viewed from a front.

Optionally, in some embodiments of the present application, a thickness of each light bar is less than or equal to 2 mm and is greater than or equal to 0.5 mm.

By setting the thickness of the light bar to be less than or equal to 2 mm and greater than or equal to 0.5 mm, the present application can ensure that the LED light string and the circuit board in the light bar coordinate well while avoiding an excessive level difference between the light bar and the display panel.

Optionally, in some embodiments of the present application, each reflective layer and the corresponding side surface of each light bar are electrically insulated from each other.

An electrical insulation design between the reflective layer and the side surface of the light bar can avoid mutual conduction between different circuit structures in the light bar, so as to facilitate controlling the display image on the light bar.

Optionally, in some embodiments of the present application, an insulating layer is disposed between each reflective layer and the corresponding side surface of each light bar, and each reflective layer is a metal layer.

By disposing the insulating layer between the reflective layer and the side surface of the light bar, the present application can avoid electrical connection between the reflective layer and the circuit board in the light bar. Also, using the metal layer as the reflective layer can make the reflective layer have a better specular reflection effect and improve a specular reflection ability of the reflective layer.

Optionally, in some embodiments of the present application, each reflective layer is electrically connected to the corresponding side surface of each light bar.

When the light bar has a monochrome image, electrically connecting the reflective layer with the side surface of the light bar is beneficial to realize series connection of the light string in the light bar and achieve a synchronous control of the light string.

Optionally, in some embodiments of the present application, each side surface of each light bar comprises a first edge and a second edge opposite to each other in the thickness direction of the light bar; and each reflective layer extends from the corresponding first edge to the corresponding second edge.

The reflective layer covers the entire side surface of the light bar, so that when the display screen displays the display image, the side surface of the light bar can reflect the display image with a maximum area. Accordingly, it can be ensured that the display image has continuous transition from the side surface of the light bar to the display panel.

Optionally, in some embodiments of the present application, each side surface of each light bar comprises a first edge and a second edge opposite to each other in the thickness direction of the light bar;

each reflective layer extends from the corresponding first edge toward the corresponding second edge, and an extending width of each reflective layer is less than a thickness of the corresponding light bar; or alternatively, each reflective layer extends from the corresponding second edge toward the corresponding first edge, and the extending width of the reflective layer is less than the thickness of the corresponding light bar.

By setting the extending width of the reflective layer to be less than the thickness of the light bar, the present application saves unnecessary reflective layers and thus reduces production costs while ensuring smooth transition of the display image between side surface of the light bar and the display panel by using the reflective layer to reflect the display image on the display panel.

Optionally, in some embodiments of the present application, a gap is defined between each reflective layer and the corresponding first edge, and a gap is defined between each reflective layer and the corresponding second edge.

Such configuration can ensure that the reflective layer can reflect the display image on the display panel to make the display image have a smooth transition between the side surface of the light bar and the display panel. This also avoids unnecessary reflective layers, thus saving the production costs to the greatest extent.

Optionally, in some embodiments of the present application, a distance between the two side surfaces of each light bar gradually increases from a side close to the display panel assembly toward a side away from the display panel assembly; or alternatively, a distance between the two side surfaces of the light bar gradually decreases from the side close to the display panel assembly toward the side away from the display panel assembly.

Such configuration makes a step formed between the light bar and the display panel change from standing vertically to obliquely, which can reduce a level difference between the side surface of the light bar and the display panel and also achieves smoother transition from the surface of the light bar to the surface of the display panel.

According to the configuration of the display screen, the structure has smoother transition from the surface, viewed by people, of the light bar to the surface of the display panel, thus reducing difficulty in manufacturing the light bar and improving production efficiency.

The present application further provides a display device, wherein the display device comprises the above-mentioned display screen.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without inventive work.

DESCRIPTION OF REFERENCE NUMERAL

Figure 1:
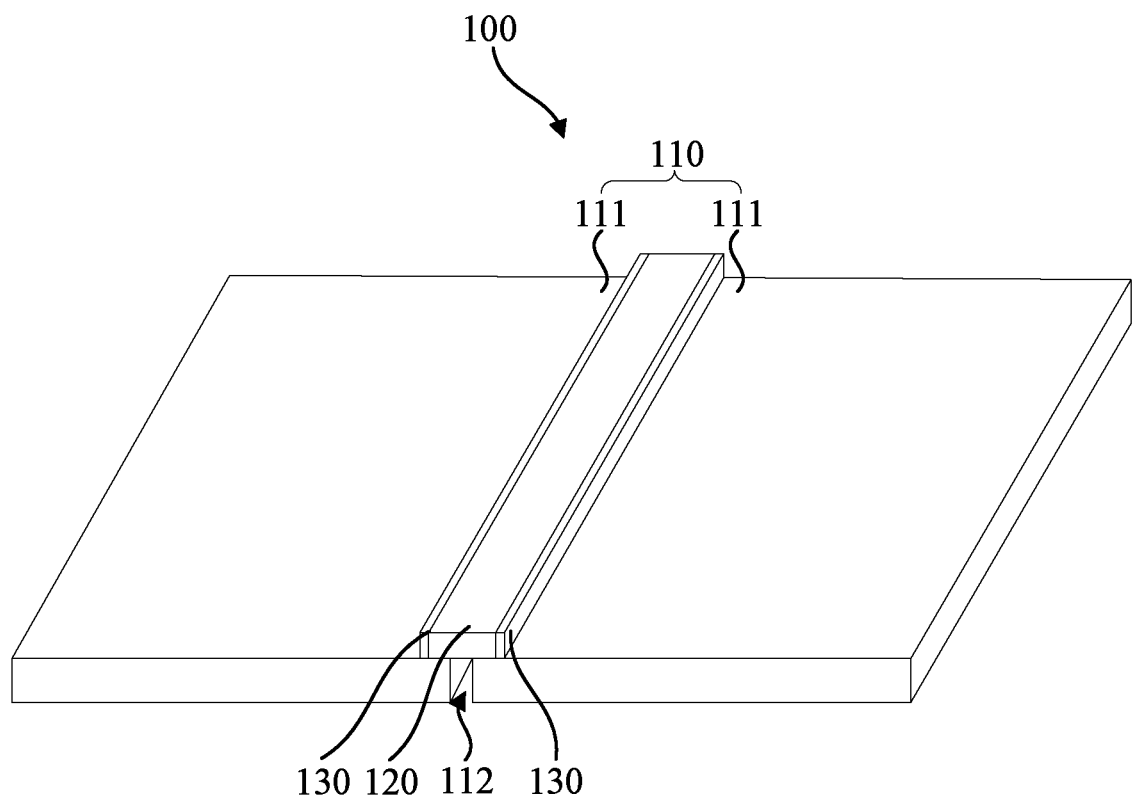
FIG. 1 is a schematic structural view illustrating a display screen according to one embodiment of the present application.
Figure 2:
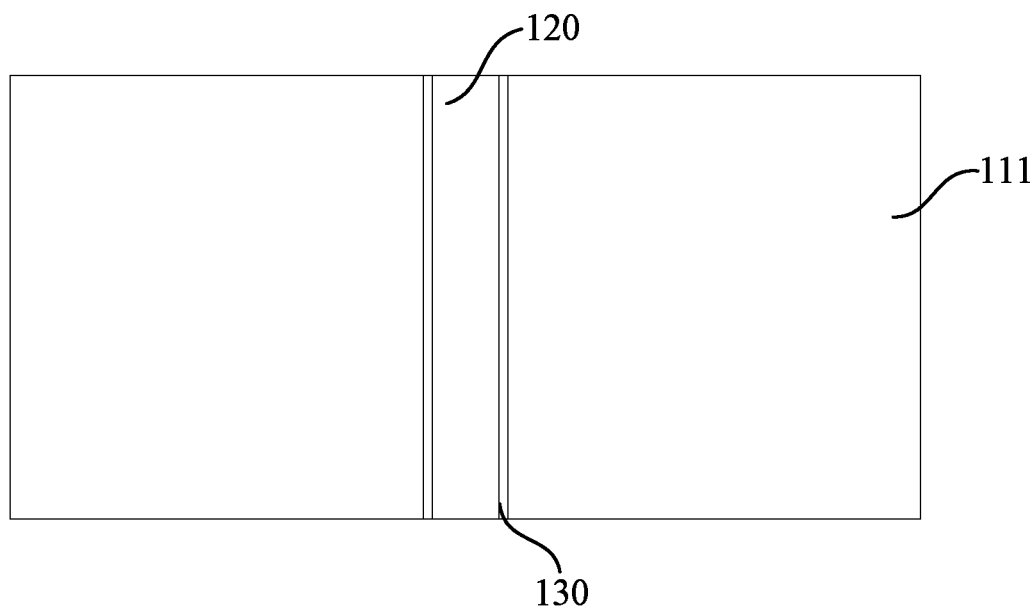
FIG. 2 is a top view illustrating the display screen according to one embodiment of the present application.
Figure 3:
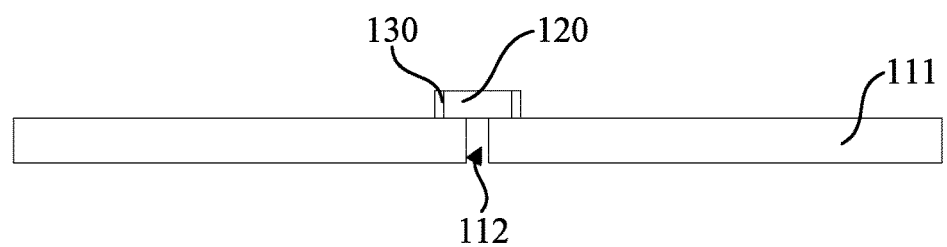
FIG. 3 is a front view illustrating the display screen according to one embodiment of the present application.
Figure 4:
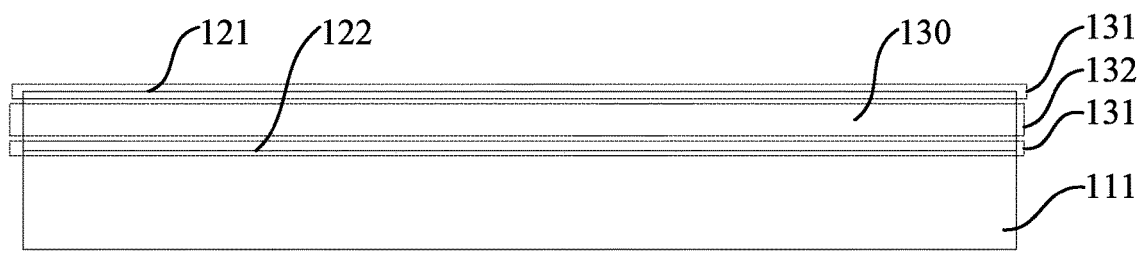
FIG. 4 is a side view illustrating the display screen according to one embodiment of the present application.

| Reference numeral | Part name |
|---|---|
| 10 | display device |
| 100 | display screen |
| 110 | display panel assembly |
| 111 | display panel |
| 112 | splicing gap |
| 120 | light bar |
| 121 | first edge |
| 122 | second edge |
| 130 | reflective layer |
| 131 | first reflective area |
| 132 | second reflective area |
| 200 | control circuit |
| 300 | housing |

DETAILED DESCRIPTION OF EMBODIMENTS

The technical solutions in the present application will be clearly and completely described below in conjunction with accompanying drawings and with reference to specific embodiments. Obviously, the embodiments are only some of the embodiments of the present application, rather than all the embodiments. Based on the embodiments in the present application, all other embodiments obtained by those skilled in the art without creative work shall fall within the protection scope of the present application. In addition, it should be understood that the specific embodiments described here are only used to illustrate and explain the present application, and are not used to limit the present application. In the present application, unless otherwise specified, directional terms such as "upper" and "lower" generally refer to the upper and lower directions of a device in actual use or work state, and specifically refer to the directions in the drawings. The terms "inner" and "outer" are referred to with reference to outlines of the device.

The present application provides a display screen and a display device. Detailed descriptions are provided below. It should be noted that an order of descriptions in the following embodiments is not intended to limit a preferred order of the embodiments.

First of all, the present application provides a display screen according to one embodiment. As shown in FIGS. 1 to 4, the display screen 100 comprises a display panel assembly 110. The display panel assembly 110 is a main display part of the display screen 100 and directly affects display performance of the display screen 100. Different display requirements can be achieved by controlling a display mode of the display panel assembly 110.

The display panel assembly 110 comprises at least two display panels 111. By splicing the display panels 111, it can prevent manufacturing difficulty from being increased with only one single display panel 111 in an overly large size. At the same time, the splicing of the display panels 111 can also meet different requirements for the display screen 100 in size, shape, display performance, and so forth to expand an application range of the display screen 100.

The display panel assembly 110 can be formed by splicing only two display panels 111. That is to say, one side edges of the two display panels 111 are spliced together. The display panel assembly 110 can also comprise multiple display panels 111, and the display panels 111 are spliced together. The multiple display panels 111 can be spliced by arranging the display panels 111 side by side along one direction or arranging the display panels 111 in an array. A number of the display panels 111 included in the display panel assembly 110 and the way in which the display panels 111 are spliced to each other can be adjusted according to actual design requirements, and there is no particular limitation here.

It should be noted that during splicing, two adjacent display panels 111 can be assembled by screws or the like to realize the splicing of the display panels 111. Such a splicing method facilitates disassembly and replacement of the display panels 111 and allows repeated assembly without damaging the display panels 111. Certainly, each two adjacent display panels 111 can also be directly bonded to each other, which is simple and convenient, and a bonding method and a bonding position can be adjusted according to design requirements such that the display panel assembly 110 have more flexible and diverse splicing methods.

The display panel assembly 110 is formed by splicing. Whether it is assembled by using connection elements or by directly bonding, there is a splicing gap 112 between each two spliced display panels 111. A size of the splicing gap 112 is directly related to manufacturing accuracy of the display panel 111 and the splicing method chosen, and the presence of the splicing gap 112 also directly affects the display performance of the display screen 100.

Optionally, the display screen 100 further comprises a plurality of light bars 120 attached to a display surface of the display panel assembly 110. Each light bar 120 covers the splicing gap 112 between the corresponding spliced display panels 111. Since the splicing gap 112 cannot perform luminous display operations, black lines appear on the display screen 100 when the display screen 100 is in use, which affects the display performance of the display screen 100. By providing the light bars 120, the luminous light bar 120 can effectively improve the display image at the splicing gaps 112, and ensure display integrity of the entire display screen 100.

It should be noted that when the display panel assembly 110 comprises multiple display panels 111, the light bar 120 covers the splicing gap 112 between any two adjacent display panels 111 to improve the display image at any splicing gap 112 so as to ensure the display integrity of the entire display screen 100.

The light bars 120 can be attached to the display panel assembly 110 by pasting, such that an attachment position of the light bar 120 can be adjusted according to changes to the splicing method of the display panel 111. This enables the light bars 120 and the display panels 111 to be combined in a more flexible and diverse manner.

The display panel assembly 110 is formed by splicing. Therefore, whether the display panel assembly 110 is assembled by using connection elements or directly bonding, there is the splicing gap 112 between any two spliced display panels 111. A size of the splicing gap 112 is directly related to manufacturing accuracy of the display panel 111 and the splicing method chosen, and the presence of the splicing gap 112 also directly affects the display performance of the display screen 100.

Optionally, the display screen 100 further comprises the light bar 120 attached to the display surface of the display panel assembly 110, and the light bar 120 covers the splicing gap 112 between the spliced display panels 111. Since the splicing gap 112 cannot perform luminous display operations, black lines appear on the display image when the display screen 100 is in use, which affects the display performance of the display screen 100. By disposing the light bar 120, the luminous light bar 120 can effectively improve the display image at the splicing gap 112 and ensure the integrity of the display image of the entire display screen 100.

It should be noted that when the display panel assembly 110 comprises multiple display panels 111, the light bar 120 covers the splicing gap 112 between any two adjacent display panels 111 to improve the display image at any splicing gap 112 to ensure the integrity of the display image of the entire display screen 100.

The light bar 120 can be attached to the display panel assembly 110 by pasting, so that an attaching position of the light bar 120 can be adjusted through adjusting the splicing method of the display panel 111, so that the light bar 120 and the display panel 111 can be combined in a more flexible and diverse manner.

It should be noted that there is a border region on an edge of the display panel 111, that is, a non-display region. When the light bar 120 is attached to the display surface of the display panel assembly 110, the light bar 120 needs to cover the non-display regions on both sides of the splicing gap 112 at the same time to make up for the non-display regions on the display screen 100. This prevents black lines appearing on both sides of the light bar 120 when the display screen 100 is in use, which is caused by the non-display regions not covered. Thus, the overall display integrity of the display screen 100 can be ensured.

Optionally, a material of the light bar 120 in the present application comprises a hard material or a soft material. When the display panels 111 are spliced in parallel, that is, when surfaces of the spliced display panels 111 are on a same plane, the light bar 120 used can be made of a hard material or a soft material, as long as the light bar 120 is attached to the display panel assembly 110 and covers the splicing gap 112.

In some embodiments, two adjacent display panels 111 are spliced at an angle. That is to say, an angle is included between planes on which the surfaces of the two display panels 111 are spliced. The light bar 120 used is made of the soft material. The light bar 120 is attached to the spliced display panels 111 and covers the splicing gap 112 between the display panels 111. That is to say, the entire light bar 120 forms an angle. By using the light bar 120 made of the soft material, it enables the splicing method of the display panel assembly 110 to be not limited to splicing on a same plane. As the splicing method of the display panel assembly 110 changes, an overall structure of the light bar 120 also changes, as long as the light bar 120 is attached to the spliced display panels 111 and covers the splicing gap 112.

The light bar 120 comprises two opposite side surfaces extending along a length direction of the splicing gap 112, that is, the two side surfaces respectively face the corresponding display panels 111. The light bar 120 has a certain thickness, and therefore, after the light bar is attached to the display panel assembly 110, there is a level difference between a top surface of the light bar 120 and the corresponding display panel 111. Consequently, when the display image is viewed from a side of the display screen 100, a black border can appear in the display image between the light bar 120 and the display panel 111 since the side surfaces of the light bar 120 cannot emit light.

The display screen 100 further comprises a plurality of reflective layers 130 arranged on at least one side surface of the light bar 120. The reflective layer 130 extends along the length direction of the splicing gap 112. That is to say, the reflective layer 130 is arranged along a direction same as an extending direction of the splicing gap 112, so that in the extending direction, the entire splicing gap 112 is provided with the reflective layer 130. This is beneficial to adjust the black border that appears on the side surface of the light bar 120.

The reflective layer 130 allows a large-surface specular reflection. When an image is displayed on the display panel 111, an emitted light is irradiated on the reflective layer 130, and then reflected by the reflective layer 130 and perceived by human eyes. Due to the specular reflection from the reflective layer 130, the display image has smooth transition from the light bar 120 to the display panel 111 when a person observes the display image from the side of the display screen 100, thereby effectively alleviating the black border problem on the side surface of the light bar 120.

In the present application, the display screen 100 comprises a display panel assembly 110, a plurality of light bars 120, and a plurality of reflective layers 130. The display panel assembly 110 comprises at least two display panels 111 with a splicing gap 112 between each two display panels 111. The light bars 120 are attached to a display surface of the display panel assembly 110, and each light bar 120 covers the corresponding splicing gap 112. The light bar 120 comprises two opposite side surfaces extending along a length direction of the splicing gap 112. At least one side surface of each light bar 120 is provided with the plurality of reflective layers 130. The reflective layer 130 extends along the length direction of the splicing gap 112. By disposing the reflective layer 130 on at least one side surface of the light bar 120, emitted light of a display image on the display screen 100 can be reflected by the reflective layer 130 after being irradiated on the reflective layer 130. As a result, when a display image of the display screen 100 is viewed from the side of the display screen 100, the display image can have smooth transition from the light bar 120 to the display panel 111, thus preventing black borders from appearing on the side surfaces of the light bars 120, thereby improving overall display performance of the display screen 100.

Optionally, only side surface of each light bar 120 is provided with the plurality of reflective layers 130. In practice, people only view the display screen 100 from one side of the display screen 100. For example, the display screen 100 is hung on the wall, and the two display panels 111 are spliced in an up-down direction. When the display screen 100 displays a display image, people mainly view from the below. In this case, by disposing the reflective layer 130 on one of the side surfaces of the light bar 120 facing downward, the black border problem on the side surface of the light bar 120 as seen by viewers can be alleviated. It is not necessary to dispose the reflective layer 130 on the side surface of the light bar 120 facing upward, so as to avoid unnecessary waste and reduce production costs.

Optionally, two side surfaces of the light bar 120 are provided with the reflective layers 130. In this case, no matter how the display screen 100 is arranged/set up for use, and no matter from which side the display screen 100 is viewed, the reflective layers 130 can alleviate the black border problem on the side surfaces of the light bar 120. Such configuration can ensure the overall display performance of the display screen 100 without limiting a setting position of the display screen 100, thereby improving flexibility and adaptability of the display screen 100.

Optionally, a surface of the reflective layer 130 comprises a first reflective area 131 and a second reflective area 132, and the first reflective area 131 is distributed at two opposite sides of the second reflective area 132 along a thickness direction of the light bar 120. When the surface of the reflective layer 130 reflects the display image of the display panel 111, an area of the surface of the reflective layer 130 close to the display panel 111—i.e., the first reflective area 131 at a side of the second reflective area 132 close to the display panel 111—receives less light from the display panel 111 due to a limitation of light output angles of the display panel 111, thus only achieving low reflection. When the display screen 100 is not performing display operations, the area of the surface of the reflective layer 130 close to the display panel 111 mainly ensures that a color of the side surface of the light bar 120 is similar to a color of the display panel 111 to avoid a color difference on the side surface of the light bar 120 when the display screen 100 is not in use.

It should be noted that the light bar 120 comprises a light string and a circuit board. The circuit board and the light string are sequentially arranged in a direction away from the display panel assembly 110. That is to say, the light string is located at a side of the light bar 120 away from the display panel assembly 110. The light string comprises a plurality of light emitting diode (LED) lights. Since the LED light string has certain brightness, an area of the side surface of the light bar 120 close to the light string—i.e., the first reflective area 131 located at one side of the second reflective area 132 away from the display panel 111—has greater brightness than brightness in other areas of the side surface of the light bar 120 when the display screen 100 displays images.

Optionally, in the present application, a grayscale value on the surface of the reflective layer 130 is less in the first reflective area 131 than in the second reflective area 132. That is to say, the surface of the reflective layer 130 has a darker color in the first reflective area 131 than in the second reflective area 132. This way, when the display screen 100 is displaying images, the brightness of the first reflective area 131 away from the display panel 111 is not overly high under an influence of the light string, thereby preventing displayed images from having differences on the side surface of the light bar 120.

When the display screen 100 stops operations, that is, when the display screen 100 does not display images, a surface of the reflective layer 130 close to the first reflective area 131 of the display panel 111 has a color closer to a color of the display panel 111 due to its smaller grayscale value. Accordingly, the side surface of the light bar 120 and the adjacent display panel 111 form a continuous image when the display screen 100 is not in use, so as to ensure an overall consist image of the display screen 100 which is not in use.

Optionally, the grayscale value of the surface of the reflective layer 130 is less than or equal to 32. Because different substances provide electromagnetic radiation of different intensities, the degree of light-sensitivity is also different, resulting in color variations between black and white, which constitutes different levels of grayscale. Generally, in visual perception, the grayscale can be roughly divided into seven levels, namely white, gray-white, light gray, gray, dark gray, light black, and black. Correspondingly, the grayscale values can be 0 to 255. When the color is white, the grayscale value is 255. When the color is black, the grayscale value is 0.

When the surface of the reflective layer 130 has greater grayscale values, the surface of the reflective layer 130 is closer to white. When the display screen 100 is not in use, the brightness of the side surface of the light bar 120 is overly great if the surface of the reflective layer 130 has greater grayscale values. There is a greater difference between the brightness of the side surface of the light bar 120 and the surface of the display panel 111, and as a result, bright borders appear on the display screen 100 when it is not in use, which affects visual quality of the display screen 100.

In actual manufacturing processes, the grayscale value of the surface of the reflective layer 130 is set to 0, 5, 10, 15, 20, 25, 30, 32, or etc. The specific value can be adjusted according to the actual condition, as long as when the display screen 100 is not in use, the image has no bright borders and has smooth transitions between the side surface of the light bar 120 and the display panel 111. There are no particular limitations.

Optionally, a thickness of the reflective layer 130 is less than or equal to 100 micrometers. If the thickness of the reflective layer 130 is too great, the reflective layer 130 protrudes by an overly great distance from the side surface of the light bar 120. The reflective layer 130 itself does not have luminescence. The thickness of the reflective layer 130 is too great and the reflective layer 130 itself does not emit light, so when viewed from a front of the display screen 100, black borders appear in an area along the thickness of the reflective layer 130, which affects the display performance of the display screen 100 in a front view.

In actual manufacturing processes, the thickness of the reflective layer 130 can be set to micrometers, 20 micrometers, 50 micrometers, 80 micrometers, 100 micrometers, or etc. The specific values of the thickness can be adjusted according to actual conditions, as long as the display performance of the display screen 100 in the front view is not affected when the side surface of the light bar 120 reflects the display image of the display panel 111. There are no other particular limitations.

Optionally, the thickness of the light bar 120 is set to be less than or equal to 2 mm and greater than or equal to 0.5 mm. If the thickness of the light bar 120 is too thick, a level difference between the light bar 120 and the display panel 111 is further increased, which affects the image transition between the light bar 120 and the display panel 111. If the thickness of the light bar 120 is too thin, it is not easy for an arrangement of the LED light string and a circuit design of the circuit board in the light bar 120, thus affecting controlling the display image on the light bar 120.

In the present application, the thickness of the light bar 120 is set to 0.5 mm, 0.8 mm, 1 mm, 1.2 mm, 1.5 mm, 1.8 mm, 2 mm, or etc. The specific values of the thickness can be adjusted according to actual conditions, as long as it can be ensured that the LED light string and the circuit board on the light bar 120 can work well together, and there is no excessively large level difference between the light bar 120 and the display panel 111. There are no other particular limitations.

It should be noted that a width of the light bar 120 is directly related to a width of the splicing gap 112 between the spliced display panels 111 and a width of the non-display region at the edge of the display panel 111. When the light bar 120 is attached to the display panel assembly 110, the light bar 120 needs to cover the splicing gap 112 and the non-display regions on the display panels 111 located at both sides of the splicing gap 112 at the same time to improve the display image and ensure the integrity of the display image of the display screen 100 in the front view.

Optionally, the reflective layer 130 and the side surface of the light bar 120 are electrically insulated from each other. The light bar 120 comprises the circuit board, and the circuit board has a multi-layer circuit design, so if the reflective layer 130 and the side surface of the light bar 120 are electrically connected, different driving circuits are connected to each other, affecting controlling the display image on the light bar 120.

A material of the reflective layer 130 can be an electrical insulating material. That is to say, the reflective layer 130 is an electrical insulating material with a specular reflection function. This can ensure that the side surface of the light bar 120 receives and reflects light emitted by the display panel 111, so that the side surface of the light bar 120 and the display panel 111 form a continuous display image, which is beneficial to a circuit design between the LED light string and the circuit board in the light bar 120, and facilitates controlling the display image on the light bar 120.

Optionally, an electrical insulating layer is disposed between the reflective layer 130 and the side surface of the light bar 120, and the reflective layer 130 is a metal layer. That is to say, the reflective layer 130 is made of a metal material. In order to avoid the reflective layer 130 from being electrically connected to the circuit board in the light bar 120, and an insulating layer is disposed between the reflective layer 130 and the side surface of the light bar 120.

Since the metal material has a metallic luster, it has a better specular reflection function when light is irradiated on the metal material. Using a metal material to make the reflective layer 130 can improve the specular reflection capability of the reflective layer 130. When the display screen 100 plays a display image, and the reflective layer 130 receives the light emitted from the display image on the display panel 111, the unique specular reflection effect of metal is used to obtain a display image after reflection, so that the display image has smooth transition between the side surface of the light bar 120 and the display panel 111. This effectively alleviates the black border problem on the side surface of the light bar 120 caused by the level difference.

In some embodiments, when the display screen 100 displays a monochrome image, the light bar 120 is also monochrome, that is, all LED lights of the LED light string in the light bar 120 have a same display mode, and the LED lights of the LED light string can be connected in series to realize a synchronous control of the LED light string. In this case, the reflective layer 130 is electrically connected to the side surface of the light bar 120. That is to say, the reflective layer 130 can be directly made of a metal material, and the reflective layer 130 is directly attached to the side surface of the light bar 120, wherein there is no need to make electrical insulation between the reflective layer 130 and the circuit in the light bar 120.

It should be noted that the reflective layer 130 can be coated on the side surface of the light bar 120 by spraying or deposition, or the reflective layer 130 can be attached to the side surface of the light bar 120 by pasting. That is to say, the reflective layer 130 can be a coating layer or an adhesive tape, as long as the surface of the reflective layer 130 has a good specular reflection ability and can receive and reflect the display image on the display panel 111.

Optionally, the side surface of the light bar 120 has a first edge 121 and a second edge 122 opposite to each other in the thickness direction of the light bar 120. The reflective layer 130 extends from the first edge 121 to the second edge 122, that is, the reflective layer 130 covers the entire side surface of the light bar 120. When the display screen 100 displays an image, the side surface of the light bar 120 can reflect the display image with a maximum area, so that the present application can ensure a smooth transition of the display image from the side surface of the light bar 120 to the display panel 111.

Optionally, the reflective layer 130 is arranged at intervals from the first edge 121 toward the second edge 122. That is to say, the reflective layer 130 extends from the first edge 121 toward the second edge 122 in a discontinuous manner. A plurality of gaps are arranged in parallel on the side surface of the light bar 120 in the thickness direction of the light bar 120, and the gaps extend along the length direction of the splicing gap 112. Such configuration allows the display image on the display panel 111 to be reflected by the side surface of the light bar 120 every certain distance as the display screen 100 is observed from the side, so as to alleviate a large-area black border problem on the side surface of the light bar 120.

Widths of the multiple gaps arranged in parallel on the side surface of the light bar 120 can be adjusted according to an actual observed range of viewers. For areas where the viewers do not observe or seldom observe, the widths of the gaps can be appropriately increased. In a frequently observed range, the gaps can be appropriately reduced in width or directly eliminated to ensure that the viewers can have comfort viewing experiences.

In some embodiments, the reflective layer 130 extends from the first edge 121 toward the second edge 122, and an extending width of the reflective layer 130 is less than the thickness of the light bar 120. That is to say, the reflective layer 130 is spaced apart from the first edge 121, and there is a gap between a side of the reflective layer 130 close to the display panel 111 and the display panel 111.

When the reflective layer 130 reflects the display image on the display panel 111, an area of the side surface of the light bar 120 close to the display panel 111 receives less light from the display panel 111 due to a limitation to light output angles of the display panel 111. As a result, this area has reduced light reflection and mainly functions to ensure that the color of the side surface of the light bar 120 is similar to the color of the display panel 111 when the display screen 100 is not displaying images. This avoids a color difference on the side surface of the light bar 120 when the display 100 is not in use.

When the display screen 100 is not performing display operations, the surface of the display panel 111 has a low grayscale value. If a material used on the side surface of the light bar 120 also has a low grayscale value, the side surface of the light bar 120 is similar in color to the surface of the display panel 111 when the display screen 100 is not performing display operations, and there is no obvious color difference. In this case, there is no need to additionally dispose the reflective layer 130 in the area of the side surface of the light bar 120 close to the display panel 111. Such configuration does not affect the overall display effect of the display screen 100, and can also reduce the use of reflective layer 130 and save the production costs.

In other embodiments, the reflective layer 130 extends from the second edge 122 toward the first edge 121. The extending width of the reflective layer 130 is less than the thickness of the light bar 120. In detail, the reflective layer 130 and the second edge 122 are spaced apart. That is to say, there is a gap between a side of the reflective layer 130 away from the display panel 111 and the surface of the light bar 120.

It should be noted that the light bar 120 is provided with the LED light string, and the LED light string is located at one side of the light bar 120 away from the display panel 111. When the display screen 100 is displaying images, the area of the side surface of the light bar 120 near the LED light string can directly display an image of the LED light string because the LED light string has a certain brightness.

In this case, the area of the side surface of the light bar 120 away from the display panel 111 does not need to be additionally provided with the reflective layer 130, thus reducing the production costs.

In alternative embodiments, there is a gap between the reflective layer 130 and the first edge 121 and also between the reflective layer 130 and the second edge 122. In other words, there is a gap between the side of the reflective layer 130 close to the display panel 111 and the display panel 111, and there is a gap between the side of the reflective layer 130 away from the display panel 111 and the top surface of the light bar 120. With such configuration, it can be ensured that the reflective layer 130 can reflect the display image on the display panel 111 to make the display image have a smooth transition between the side surface of the light bar 120 and the display panel 111. This also avoids unnecessary reflective layers 130, thus saving the production costs to the greatest extent.

Optionally, a distance between the two side surfaces of the light bar 120 gradually increases from the side close to the display panel assembly 110 toward the side away from the display panel assembly 110. That is to say, the side surfaces of the light bar 120 gradually open wider from the side close to the display panel assembly 110 to the side away from the panel assembly 110. Such configuration makes a step formed between the light bar 120 and the display panel 111 change from standing vertically to obliquely, which can reduce a level difference between the side surface of the light bar 120 and the display panel 111 and also achieves smoother transition from the surface of the light bar 120 to the surface of the display panel 111.

In some embodiments, only one of the two side surfaces of the light bar 120 gradually open wider from the side close to the display panel assembly 110 toward the side away from the display panel assembly 110, while the other side surface is kept perpendicular to the display panel 111. For example, the display screen 100 is hung on the wall, and the spliced two display panels 111 are spliced in an up-down direction. When the display screen 100 is displaying images, people mainly view from the below. In this case, the side surface of the light bar 120 facing downward gradually open wider in a direction away from the display panel assembly 110, and the side surface of the light bar 120 facing upward is kept perpendicular to the display panel 111. Such configuration achieves smoother transition between the side surface of the light bar 120 and the surface of the display panel 111, reduces manufacturing difficulty of the light bar 120, and improves the production efficiency.

In alternative embodiments, both side surfaces of the light bar 120 gradually open wider in a direction from the side close to the display panel assembly 110 toward the side away from the display panel assembly 110. In this case, no matter how the display screen 100 is arranged/set up for use, and no matter from which side the display screen 100 is viewed, smooth transition is achieved between the surfaces of the light bar 120 and the surface of the display panel 111. In addition to that, such configuration can ensure the overall display performance of the display screen 100 while preventing the display screen 100 from being restricted by a setting position, thereby improving the flexibility and adaptability of the display screen 100.

It should be noted that when the side surfaces of the light bar 120 gradually open wider in the direction away from the display panel assembly 110, the side surfaces are opened wider in a stepwise manner, or a gradual and uniform manner, or other non-uniform manner. The specific configuration can be adjusted according to actual design requirements, and the present application is not limited in this regard.

Optionally, a distance between the two side surfaces of the light bar 120 gradually decreases from the side close to the display panel assembly 110 toward the side away from the display panel assembly 110. That is to say, the side surfaces of the light bar 120 gradually get closer from the side close to the display panel assembly 110 to the side away from the panel assembly 110. Such configuration makes a step between the light bar 120 and the display panel 111 change from standing vertically to obliquely, thereby reducing the level difference between the side surface of the light bar 120 and the display panel 111, thus achieving smoother transition from the surface of the light bar 120 to the surface of the display panel 111.

In some embodiments, only one of the two side surfaces of the light bar 120 gradually get closer from the side close to the display panel assembly 110 toward the side away from the display panel assembly 110, while the other side surface is kept perpendicular to the display panel 111. The side surface of the light bar 120, which is obliquely arranged with the display panel 111 is arranged at the side from which the display panel 111 is viewed. Such configuration can not only achieve smoother transition from the surface of the light bar 120 to the surface of the display panel 111, but also reduce difficulty in manufacturing the light bar 120 and improve production efficiency.

In alternative embodiments, the two side surfaces of the light bar 120 gradually get closer from the side close to the display panel assembly 110 toward the side away from the display panel assembly 110. In this case, no matter how the display screen 100 is arranged/set up for use, and no matter from which side the display screen 100 is viewed, such configuration can achieve smooth transition between the surface of the light bar 120 and the surface of the display panel 111, and ensure the overall display performance of the display screen 100 without limiting a setting position of the display screen 100, thereby improving the flexibility and adaptability of the display screen 100.

It should be noted that when the side surfaces of the light bar 120 gradually get closer to each other in a direction away from the display panel assembly 110, the side surfaces get closer in a stepwise manner, or a gradual and uniform manner, or other non-uniform manner. The specific configuration can be adjusted according to actual design requirements, and the present application is not limited in this regard.

Optionally, a distance between the two side surfaces of the light bar 120 is the same from the side close to the display panel assembly 110 to the side away from the display panel assembly 110, but the two side surfaces of the light bar 120 are both arranged at an acute angle with respect to the respective corresponding display panel 111, and the two side surfaces are inclined in a same direction with respect to the respective corresponding display panel 111. That is to say, the light bar 120 has a prismatic structure as a whole, and its cross section has a parallelogram shape. In other words, one of the side surfaces gradually opens wide in the direction that the light bar 120 is away from the display panel assembly 110, and the other side surface gradually gets closer in the direction that the light bar 120 is away from the display panel assembly 110.

Such configuration allows a specific structure of the light bar 120 to be adjusted according to environments and requirements of the display screen 100. The structure can be a regular or irregular shape, as long as the surface of the light bar 120 facing the display panel 111 has smoother transition.

Secondly, the present application also provides a display device. The display device comprises a display screen. The specific structure of the display screen is shown in the above-mentioned embodiments. Since this display device adopts all the technical solutions of all the above-mentioned embodiments, it has at least all the advantages of the technical solutions of the above-mentioned embodiments, and a detailed description thereof is omitted herein for brevity.

Figure 5:
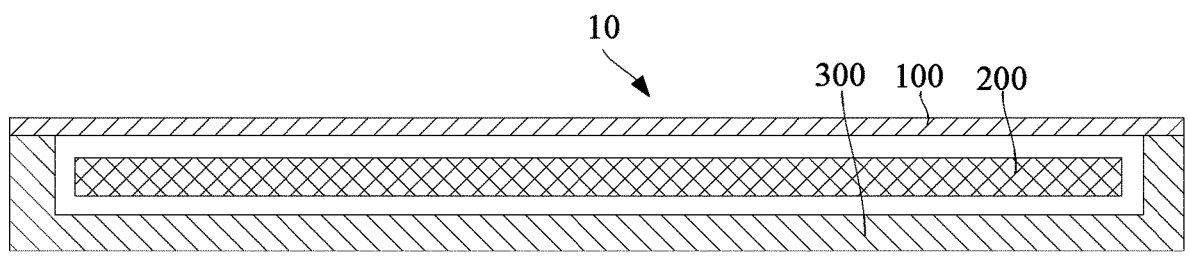
FIG. 5 is a schematic structural view illustrating the display device according to one embodiment of the present application.

FIG. 5 is a schematic structural view illustrating the display device according to one embodiment of the present application. As shown in FIG. 5, the display device 10 comprises a display screen 100, a control circuit 200 and a housing 300. The housing 300 is connected to the display screen 100 to support and fix the display screen 100, the control circuit 200 is arranged in the housing 300, and the control circuit 200 is electrically connected to the display screen 100 to control the display screen 100 to display images.

The display screen 100 can be fixed to the housing 300 to form an integral body with the housing 300. The display screen 100 and the housing 300 form a closed space for accommodating the control circuit 200. The control circuit 200 can be a motherboard of the display device 10. At the same time, the control circuit 200 can also integrate one or more functional components such as a battery, an antenna structure, a microphone, a speaker, a headphone interface, a universal serial bus interface, a camera, a distance sensor, an ambient light sensor, a receiver, and a processor, so that the display device 10 is suitable for various applications.

It should be noted that the display device 10 is not limited to the above content. The display device 10 can also comprise other components, such as a camera, an antenna structure, a fingerprint unlocking module, etc., to expand its use range, and the present application is not limited in this regard. The display device 10 of the present application has a wide range of applications, including televisions, computers, flexible displays like foldable and rollable display screens 100, lighting, and etc., and all of them belong to the application range of the display device 10 of the present application.

The above is a detailed description to the display screen and the display device of the present application. Specific examples are used in the present disclosure to illustrate working principles and embodiments of the present application. The descriptions of the above embodiments are only used for ease of understanding the present application. Those skilled in the art can modify the embodiments and the application range according to the ideas of the present application. In conclusion, the contents of the specification should not be construed as a limitation to the present application.

What is claimed is:

1. A display screen, comprising:
    a display panel assembly comprising at least two display panels with a splicing gap between each two display panels;
    a plurality of light bars attached to a display surface of the display panel assembly, wherein the light bars cover the splicing gaps, and each light bar comprises two opposite side surfaces extending along a length direction of the corresponding splicing gap;
    a plurality of reflective layers disposed on at least one side surface of each light bar, wherein each reflective layer extends along the length direction of the corresponding splicing gap; and
    a surface of each reflective layer comprises a first reflective area and a second reflective area, wherein the first reflective area is disposed at two opposite sides of the second reflective area along a thickness direction of the light bar, and a grayscale value on the surface of each reflective layer is less in the first reflective area than in the second reflective area.

2. The display screen according to claim 1, wherein the display panel assembly comprises multiple display panels spliced together.

3. The display screen according to claim 2, wherein each light bar covers the splicing gap between corresponding two adjacent display panels.

4. The display screen according to claim 1, wherein an edge of each display panel comprising a non-display area, and each light bar covers the non-display areas at two sides of the corresponding splicing gap.

5. The display screen according to claim 2, wherein an angle is included between planes on which surfaces of two adjacent display panels are located.

6. The display screen according to claim 1, wherein the plurality of reflective layers are disposed on two side surfaces of each light bar.

7. The display screen according to claim 1, wherein each light bar comprises a light string and a circuit board, and each light string is disposed on one side of the corresponding light bar away from the display panel assembly.

8. The display screen according to claim 1, wherein a thickness of each reflective layer is less than or equal to 100 micrometers.

9. The display screen according to claim 1, wherein a thickness of each light bar is less than or equal to 2 mm and is greater than or equal to 0.5 mm.

10. The display screen according to claim 1, wherein each reflective layer and the corresponding side surface of each light bar are electrically insulated from each other.

11. The display screen according to claim 10, wherein an insulating layer is disposed between each reflective layer and the corresponding side surface of each light bar, and each reflective layer is a metal layer.

12. The display screen according to claim 1, wherein each reflective layer is electrically connected to the corresponding side surface of each light bar.

13. The display screen according to claim 1, wherein each side surface of each light bar comprises a first edge and a second edge opposite to each other in the thickness direction of the light bar; and each reflective layer extends from the corresponding first edge to the corresponding second edge.

14. The display screen according to claim 1, wherein each side surface of each light bar comprises a first edge and a second edge opposite to each other in the thickness direction of the light bar;
    each reflective layer extends from the corresponding first edge toward the corresponding second edge, and an extending width of each reflective layer is less than a thickness of the corresponding light bar; or alternatively, each reflective layer extends from the corresponding second edge toward the corresponding first edge, and the extending width of the reflective layer is less than the thickness of the corresponding light bar.

15. The display screen according to claim 14, wherein a gap is defined between each reflective layer and the corresponding first edge, and a gap is defined between each reflective layer and the corresponding second edge.

16. The display screen according to claim 1, wherein a distance between the two side surfaces of each light bar gradually increases from a side close to the display panel assembly toward a side away from the display panel assembly; or alternatively, a distance between the two side surfaces of the light bar gradually decreases from the side close to the display panel assembly toward the side away from the display panel assembly.

17. The display screen according to claim 16, wherein one side surface of each light bar is disposed perpendicular to a surface of the display panel, and another side surface of the light bar is disposed at an angle with respect to the surface of the display panel.

18. A display device, wherein the display device comprises the display screen of claim 1.

19. A display screen, comprising:
- a display panel assembly comprising at least two display panels with a splicing gap between each two display panels;
- a plurality of light bars attached to a display surface of the display panel assembly, wherein the light bars cover the splicing gaps, and each light bar comprises two opposite side surfaces extending along a length direction of the corresponding splicing gap;
- a plurality of reflective layers disposed on at least one side surface of each light bar, wherein each reflective layer extends along the length direction of the corresponding splicing gap; and
- the grayscale value on the surface of each reflective layer is less than or equal to 32.

\* \* \* \* \*